United States Patent
Palmin

(10) Patent No.: US 10,320,747 B2
(45) Date of Patent: Jun. 11, 2019

(54) AUTOMATION NETWORK AND METHOD FOR MONITORING THE SECURITY OF THE TRANSFER OF DATA PACKETS

(71) Applicant: SIEMENS AKTIENGESELLSCHAFT, München (DE)

(72) Inventor: Anna Palmin, Karlsruhe (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 138 days.

(21) Appl. No.: 15/216,394

(22) Filed: Jul. 21, 2016

(65) Prior Publication Data
US 2017/0026341 A1    Jan. 26, 2017

(30) Foreign Application Priority Data
Jul. 22, 2015    (EP) .................................... 15177824

(51) Int. Cl.
*H04L 29/06*    (2006.01)

(52) U.S. Cl.
CPC .......... *H04L 63/0236* (2013.01); *H04L 63/02* (2013.01); *H04L 63/1408* (2013.01); *H04L 63/166* (2013.01); *H04L 67/40* (2013.01); *H04L 69/16* (2013.01)

(58) Field of Classification Search
None
See application file for complete search history.

(56) References Cited

U.S. PATENT DOCUMENTS

| 5,606,668 A | * | 2/1997 | Shwed | .................... H04L 29/06 380/42 |
| 2002/0032871 A1 | * | 3/2002 | Malan | .................... H04L 41/22 726/23 |
| 2003/0195861 A1 | * | 10/2003 | McClure | ................. H04L 41/12 |

(Continued)

FOREIGN PATENT DOCUMENTS

| WO | WO-2005015370 A1 | * | 2/2005 | ......... H04L 63/1408 |
| WO | WO 2005015370 A1 | | 2/2005 | |

OTHER PUBLICATIONS

Greenwald, M. et al., "Designing an academic firewall: policy, practice, and experience with SURF", Network and Distributed System Security, 1996, Proceedings of the Symposium on San Diego, CA, USA, Feb. 22-23, 1996, S. 79-92.; 1996.

(Continued)

*Primary Examiner* — William J. Goodchild
(74) *Attorney, Agent, or Firm* — Henry M. Feiereisen LLC

(57) ABSTRACT

An automation network for monitoring the security of a transfer of data packets includes a first processing device configured to transfer a data packet from an installation component and to the installation component, and a second data processing device which is bidirectionally connected to the first data processing device. The second data processing device generates at least one response packet, when detecting a transmission of the data packet from the first data processing device, and sends the at least one response packet back to the first data processing device. The first data processing device includes a response filter which is configured to execute a check and subsequent rejection/acceptance of the at least one response packet.

18 Claims, 1 Drawing Sheet

(56) References Cited

U.S. PATENT DOCUMENTS

2006/0236370 A1\* 10/2006 John .................... H04L 63/102
726/1
2009/0328090 A1\* 12/2009 Randolph ............ H04H 60/372
725/14
2014/0050317 A1\* 2/2014 Sabin ...................... H04L 9/08
380/44

OTHER PUBLICATIONS

Palmin, Anna et al., "Ganzheitliches anlagenweites Security Management—Werkzeuge fuer die automatisierte Unterstuetzung", ATP Edition, DIV Deutscher Industrieverlag GMBH, DE, Bd. 54, Nr. 3, Jan. 1, 2012, S. 34-40.; 2012.

\* cited by examiner

AUTOMATION NETWORK AND METHOD FOR MONITORING THE SECURITY OF THE TRANSFER OF DATA PACKETS

CROSS-REFERENCES TO RELATED APPLICATIONS

This application claims the priority of European Patent Application, Ser. No. 15177824.8, filed Jul. 22, 2015, pursuant to 35 U.S.C. 119(a)-(d), the disclosure of which is incorporated herein by reference in its entirety as if fully set forth herein.

BACKGROUND OF THE INVENTION

The present invention relates to an automation network for monitoring the security of transfer of data packets, and to a method for monitoring the security of the transfer of data packets.

The following discussion of related art is provided to assist the reader in understanding the advantages of the invention, and is not to be construed as an admission that this related art is prior art to this invention.

From the point of view of data processing, industrial automation networks consist of a data network and of data processing devices, which are connected to one another in order to perform a data communication through the data network. For instance, in order to enable an operation of an industrial plant which is automated by the automation network from a remote station, automation networks can be linked by a gateway to a public network, e.g. Internet, for instance. Various advantages in the realization of modern automation networks result in the increased use of IT technologies such as Ethernet and the Internet Protocol (IP). This nevertheless results in an increase in the security risks, for instance due to unauthorized attacks from the outside into the respective automation network.

The term "automation networks" is to be understood hereinafter as automation systems, control installations, production installations, manufacturing installations or suchlike. The automation devices of the automation installation can be embodied to perform a computing task. For this purpose the automation devices may include a computing facility, for instance a processor (CPU). Furthermore, the automation devices may include input/output facilities, which can detect process parameters and can output corresponding actuating signals.

The paper "Ganzheitliches anlagenweites Security Management—Werkzeuge für die automatisierte Unterstützung" [Global installation-wide security management—tools for automated assistance] by Anna Palmin, Stefan Runde and Pierre Kobes, published in March 2012, pages 34-40, describes measures for improving the security in industrial automation networks. One of the important measures within the scope of a global security management system is the acquisition and evaluation of messages which various components of the automation network generate during events and which possibly permit an attack to be identified. A superordinate unit collects and evaluates the messages in order to identify from the notified single events or a composition of a number of events whether an attack is actually taking place and, if necessary, reports this to a location so that suitable measures can be introduced as a response to the identified attack. This functionality is referred to as Security Event Management (SEM). A further functionality relates to the generation of reports, in order to prove the adherence to guidelines. This is referred to as Security Information Management (SIM). If one unit joins the two cited functionalities, it is referred to as Security Information and Event Management (SIEM). A computing unit with a software tool which serves in an automation network to realize a SIEM is preselected in the afore-cited paper as a security station. The security station is arranged structurally in a process control system (PCS). An operator station and the security station can run jointly on one personal computer (PC) or on two separate PCs. The security station can likewise be realized on a maintenance station which is already available. It serves to integrate the security management into the process control system and to allow it to run in parallel to the installation automation. The existing views such as e.g. operation view and maintenance view are thus extended by an additionally integrated security view onto the installation. Moreover, the message and archiving system present in the automation network can be used to process the messages generated for security-relevant events. Alternatively to an integrated software tool, the security station can be realized as a tool which is independent of specific products and has clearly defined interfaces. It is thus flexible in the context of PCS and SCADA systems (Supervisory Control and Data Acquisition). The software tool of the security station serves to monitor the security in the automation network, namely on the basis of acquiring and evaluating messages, which a control unit, frequently referred to as operator station, a programmable logic controller, a so-called controller, network components, e.g. routers, switches or gateways, or field devices, e.g. actuators or measuring transducers for pressure, temperature or flow rate generate. These devices are generalized here as data processing device or in brief as event sources and generate corresponding messages on account of their corresponding preconfiguration with security-relevant events. Examples of security-relevant events are a detected failed logon attempt on a PC, which is recorded in the Windows Event Log, or a detected unauthorized access to an IP address, which is rejected by a Firewall and is if necessary written into a log file. A normalization of the reported events is performed in so-called connectors of the SIEM system. The normalization is generally realized as the mapping of individual components or parameters on the data structure of the SIEM.

A SIEM system is generally configured in the engineering phase, i.e. in the project planning and the commissioning of an automation technology installation. The configuration comprises inter alia the linking of data processing nodes, which come into consideration as sources for messages of security-relevant events, to a SIEM system using the corresponding connectors. Attempts are made to ensure that the SIEM system does not communicate with any sources of event messages which are unknown to it, since this could negatively affect the reliability of the security monitoring. It must likewise be ensured that with security-relevant events, corresponding messages must actually be generated by the relevant data processing device. The primary objective of a SIEM system used in an automation installation consists in promptly identifying and evaluating reports of attempted attacks or deviations from the normal state. The SIEM system should enable attempted attacks and abnormalities to be responded to promptly and adequately, as well as the long-term storage of security-relevant information and the generation of reports.

It would therefore be desirable and advantageous to specify an automation network and a method which improves the quality and/or reliability of the identification of indications of attempted attacks or deviations from the normal state in an automation network.

SUMMARY OF THE INVENTION

According to one aspect of the present invention, an automation network for monitoring the security of the transfer of data packets includes a first processing device configured to transfer a data packet from a plant component and to the plant component, and a second data processing devices bidirectionally connected to the first data processing device, said second data processing device configured to generate at least one response packet, when detecting a transmission of the data packet from the first data processing device, and to send the at least one response packet back to the first data processing device, the first data processing device including a response filter which is configured to execute a check and subsequent rejection/acceptance of the at least one response packet.

According to another aspect of the present invention a method for monitoring the security of a transfer of data packets in an automation network, having first and second data processing devices which are bidirectionally connected to one another, includes at the first data processing device, communicating of a data packet from a plant component and to the plant component, at the second data processing device, generating at least one response packet, when detecting a transmission of the data packet from the first data processing device, and sending the at least one response packet back to the first data processing device, and at the first data processing device, checking and subsequently accepting or rejecting response packets by a response filter.

It was identified in accordance with an aspect of the invention that the communication of the first data processing device of the plant components and systems with a second data processing device is not unidirectional but instead bidirectional. The second data processing device sends response values to the components and systems in accordance with the TCP protocol. If Firewalls are used between the first data processing device of the plant components and the second data processing means, the overall TCP-based communication is generally allowed to pass by opening the corresponding port.

In accordance with an aspect of the invention, a response filter is now integrated in the first data processing device of the plant component. The filter checks the packets of the second data processing device, e.g. a Syslog or SIEM server and only accepts selected packets as allowed packets. All further packets are rejected by the first data processing device of the plant components concerned. This integrated response filter guarantees a response-free transfer of security events and further information from the first data processing device of the plant components or installation systems to the second data processing device. The transfer of security events from the first data processing device of the various installation plant components and systems to a second data processing device used in the installation does not negatively affect the level of protection and the availability of an installation, i.e. the transfer takes place in a response-free manner. Moreover, the absence of a response to the transfer of security events and further information can advantageously be proven and is thus guaranteed. For the purpose of ensuring a comprehensive protection of the installation against unauthorized attacks and the highest possible installation availability, the required provable absence of response to the data transfer from the second data processing device is of high importance.

According to another advantageous feature of the present invention, the second data processing device for communication with the first data processing device can include a server. This can be embodied as a Syslog server or Syslog-ng server or Rsyslog server. The server can also be embodied as a SIEM server. Other servers can naturally also be used.

According to another advantageous feature of the present invention, the first data processing device for communication with the second data processing device can include a TCP-based client. Moreover, the TCP-based client may include a protocol stack, with the response filter being provided in the protocol stack.

According to another advantageous feature of the present invention, assumed response packets can be embodied at least as synchronization packets and/or finish packets and/or acknowledgement packets. Other response packets can also be assumed however. All further packets are preferably rejected by the first data processing device of the plant components concerned. In this case, confirmation of the packet is omitted.

According to another advantageous feature of the present invention, the data packets can be security events, e.g. event, threat or risk data.

According to another advantageous feature of the present invention, a warning signal can be outputted on a service device when a response packet is rejected. i.e. a corresponding message is generated, which, depending on the configuration performed, is sent e.g. to a process control or SCADA system or via SMS to a responsible person (e.g. the operator of the installation, the administrator or an IT expert) for instance, and informs him/her that the first data processing device in the plant component has received a non-permissible response value from the second data processing device. This information is very important since it is indicates that the second data processing device used, e.g. a SIEM or Syslog server is possibly not trustworthy.

According to another advantageous feature of the present invention, a firewall for checking the data packets may also be provided to increase the security in at least the first data processing device.

The response filter is advantageously always active. The protection ensured in this way therefore cannot be cancelled deliberately or unintentionally. This is advantageous particularly with respect to the filtering of data packets which may be realized by the use of firewalls in that the inventively integrated response filter is more systematic, more cost-effective and easier to configure since a firewall can if necessary be unintentionally or willfully manipulated for instance.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
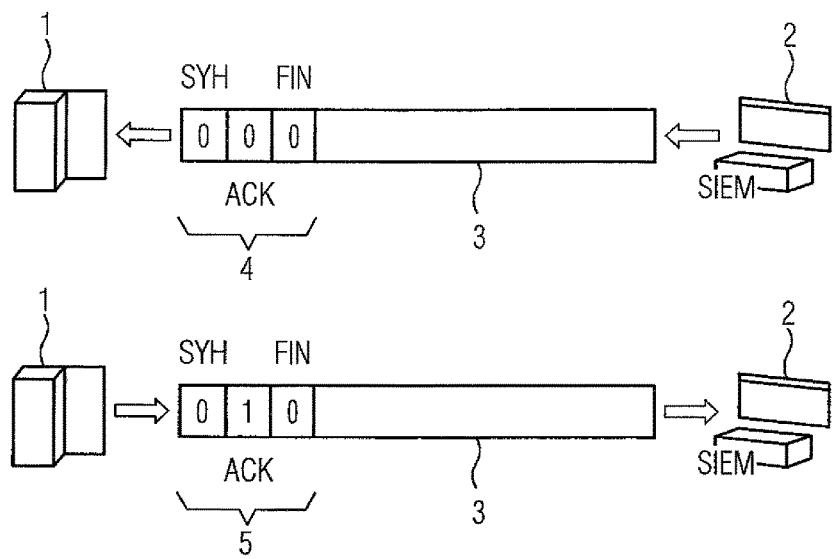
FIG. 1 is an illustration of a transmission of security events and further information according to the prior art.

Throughout all the figures, same or corresponding elements may generally be indicated by same reference numerals. These depicted embodiments are to be understood as illustrative of the invention and not as limiting in any way.

It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a transmission of security events and further information according to the prior art. FIG. 1 shows a TCP-based Syslog version, which is preferred compared with the UDP-based version on account of the reliability ensured by the receipt acknowledgment inherent in TCP. This results in the communication of the first data processing device 1 of the plant components with a SIEM server or a Syslog server 2 not being unidirectional but instead bidirectional 3. According to the TCP protocol the SIEM or Syslog server 2 sends at least the synchronization, finish packets and acknowledgements 4 as response values to the first data processing device 1 of the plant components, which receive a confirmation, namely the so-called response packet 5 from the first data processing device 1. If firewalls are used between the plant components and systems, the overall TCP-based communication is generally allowed to pass by opening the corresponding port. Moreover, the use of firewalls for the purpose of filtering the communication between the first data processing device 1 of the plant components/systems and the Syslog/SIEM server 2 can result in high additional costs, a high outlay for the configuration and the monitoring of the firewall and possibly can cause an adverse effect on the performance. Furthermore, in respect of security, there is the risk that the firewall used is deliberately or unintentionally manipulated, which, e.g. may result in the deactivation of the filtering and/or the deactivation of the messages or the transmission of faulty alarms.

Figure 2:
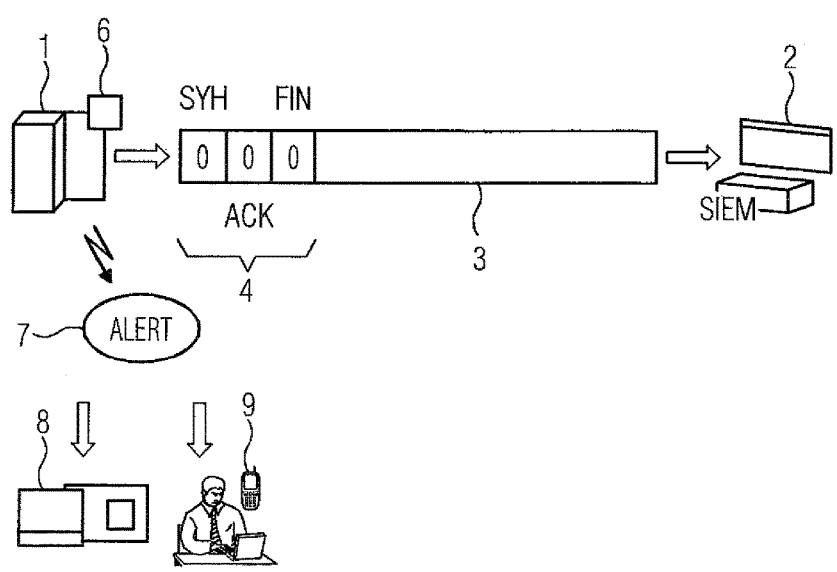
FIG. 2 is an illustration of a response-free transmission of security-events and further information by integrated response filtering in accordance with the present invention.

This is now achieved by an aspect of the invention. FIG. 2 shows a response-free transfer of security events and further information by the integrated response filtering. With the use of the TCP-based Syslog to transfer security events and further information from the automation components and systems to a Syslog or SIEM server 2, a response filter 6 is integrated in the TCP implemented in the first data processing device 1. It checks the response value received by the Syslog or SIEM server 2 and only accepts the synchronization, finish packets and acknowledgements 4, i.e. only the packets with the set SYN, ACK or FIN flag, as permitted response values.

All further packets are rejected by the plant components concerned or their first data processing device 1. In this case, confirmation of the packet is omitted. In addition, a corresponding message (alarm signal 7) is generated, which, depending on the configuration, is sent e.g. to a process control or SCADA system 8 or via SMS 9 to a responsible person (e.g. the operator of the installation, the administrator or an IT expert), and informs him/her that the system component concerned has received a non-permissible response value from the Syslog server or SIEM server 2. This information is very important since it indicates that the integrity of SIEM server 2 or Syslog server may have been compromised. This integrated response filter 6 guarantees a response-free transfer of security events and further information from the first data processing device 1 of the plant components to the Syslog server or SIEM server 2. The response filter 6 integrated in the TCP stack of the first data processing device 1 may be constantly active, thus ensuring continued protection as it cannot be deliberately or unintentionally deactivated.

In contrast to the use of firewalls to realize a filtering of data packets, the use of the integrated response filter 6 in the TCP stack of the first data processing device 1 in accordance with the present invention has the advantage of realizing a more systematic, more cost-effective, easier to configure and more reliable operation. This is particularly the case since a firewall may be manipulated inadvertently or willfully.

A further advantage relates in the simple verifiability. It takes place with the aid of messages that are generated if an "impermissible" response value is detected, and messages sent to a process control or SCADA system 8 or via SMS 9 to a responsible person e.g. the operator of an installation, the administrator or an IT expert.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An industrial automation network for monitoring the security of a transfer of data packets, comprising:
    a first processing device configured to transfer a data packet from an plant component and to the plant component; and
    a second data processing device bidirectionally connected to the first data processing device, said second data processing device configured to generate at least one response packet, when detecting a transmission of the data packet from the first data processing device, and to send the at least one response packet back to the first data processing device;
    said first data processing device including a response filter which is configured to execute a check and subsequent rejection/acceptance of the at least one response packet;
    wherein the industrial automation network is a network selected from a control automation installation network, a production automation installation network, a manufacturing automation installation, and any combination thereof; and
    wherein the plant component comprise at least one input and/or output facility which can detect process parameters and/or can output corresponding actuating signals.

2. The automation network of claim 1, wherein the second data processing device comprises a server.

3. The automation network of claim 2, wherein the server is a Syslog server or a Syslog-ng server or a Rsyslog server, or any combination thereof.

4. The automation network of claim 2, wherein the server is a SIEM server.

5. The automation network of claim 1, wherein the first data processing device comprises a TCP-based client.

6. The automation network of claim 5, wherein the TCP-based client comprises a protocol stack, said response filter being provided in the protocol stack.

7. The automation network of claim 1, wherein the response packets comprise at least one of synchronization packets, finish packets, acknowledgment packets, or any combination thereof.

8. The automation network of claim 1, wherein the data packets are security events.

9. The automation network of claim 1, further comprising a service device configured to output a warning signal, when a response packet is rejected.

10. The automation network of claim 1, further comprising a firewall configured to check the data packets at least in the first data processing device.

11. A method for monitoring the security of a transfer of data packets in an industrial automation network, having first and second data processing devices which are bidirectionally connected to one another, the method comprising:
- at the first data processing device, communicating of a data packet from a plant component and to the plant component;
- at the second data processing device, generating at least one response packet, when detecting a transmission of the data packet from the first data processing device, and sending the at least one response packet back to the first data processing device; and
- at the first data processing device, checking and subsequently accepting or rejecting response packets by a response filter;
- wherein the Industrial automation network is a network selected from a control automation installation network, production automation installation network, a production automation installation, a manufacturing automation installation, and any combination thereof; and,
- wherein the plant component comprise at least one input and/or output facility which can detect process parameters and/or can output corresponding actuating signals.

12. The method of claim 11, wherein the response filter is constantly active.

13. The method of claim 11, further comprising generating a warning signal for display on a service device in response to a rejection of a response packet.

14. The method of claim 11, wherein responsive to rejection of a response packet, the confirmation of the receipt of the response packet from the first data processing device to the second data processing device is omitted.

15. The method of claim 11, wherein the second data processing device communicates with the first data processing device via a server, the server being at least one of a Syslog server, a Syslog-ng server, a Rsyslog server, a SIEM server, or any combination thereof.

16. The method of claim 11, wherein the first data processing device communicates with the second data processing device via transmission control protocol (TCP).

17. The automation network of claim 1, wherein the plant component is selected from a programmable logic controller (PLC) device, an actuator, or a measuring transducer device.

18. The method of claim 11, wherein the plant component is selected from a programmable logic controller (PLC) device, an actuator, or a measuring transducer device.

* * * * *